United States Patent [19]

Haggerty et al.

[11] Patent Number: 5,439,328
[45] Date of Patent: Aug. 8, 1995

[54] SINGLE-HEAD DRILL WITH VIDEO ATTACHMENT

[75] Inventors: Kevin C. Haggerty, Carlisle, Mass.; David L. Fox, North Rose, N.Y.; John L. Fox, Rose, N.Y.; Richard O. Toles, Wolcott, N.Y.

[73] Assignee: E. I. Du Pont de Nemours and Company, Wilmington, Del.

[21] Appl. No.: 109,371

[22] Filed: Aug. 24, 1993

[51] Int. Cl.6 .......................... B23B 35/00; B23B 41/00
[52] U.S. Cl. ...................... 408/1 R; 408/13; 408/16
[58] Field of Search ...................... 408/1 R, 13, 16, 91

[56] References Cited

U.S. PATENT DOCUMENTS

| | | | |
|---|---|---|---|
| 3,376,762 | 4/1968 | Brault | 408/16 |
| 3,574,946 | 4/1971 | Mayston | 408/16 |
| 4,123,695 | 10/1978 | Hale et al. | 318/561 |
| 4,171,162 | 10/1979 | Gerard et al. | 356/401 |
| 4,568,971 | 2/1986 | Alzmann et al. | 358/101 |
| 4,596,037 | 6/1986 | Bouchard et al. | 382/8 |
| 5,036,574 | 8/1991 | Kakimoto | 29/335 |

FOREIGN PATENT DOCUMENTS

| | | | |
|---|---|---|---|
| 636061 | 9/1936 | Germany | 408/16 |
| 945486 | 6/1956 | Germany | 408/16 |
| 2606378 | 9/1976 | Germany | 408/16 |
| WO91/01847 | 2/1991 | WIPO | |

*Primary Examiner*—Daniel W. Howell
*Attorney, Agent, or Firm*—Thomas H. Magee

[57] ABSTRACT

An apparatus for drilling holes in flexible materials used for flexographic printing includes a table which receives single sheets of flexible material which are to be drilled by a downwardly moveable drill. An optical mirror, TV-camera and monitor serve as viewing means to directly view the exact position on the surface of the material to be drilled. The optical mirror occupies a first position between the moveable drill and the flexible material, the first position being directly below the drill and directly above a target location on a single sheet. The optical mirror is retractable to a second position away from the path of the moveable drill, the optical mirror being replaced in the first position after the drilling is accomplished.

9 Claims, 2 Drawing Sheets

SINGLE-HEAD DRILL WITH VIDEO ATTACHMENT

BACKGROUND OF THE INVENTION

1. Field of the Invention

This invention pertains to a drill for use with flexible materials which are used in the flexographic printing industry. More particularly, it relates to a drill with a single drill head and a video locating device.

2. Discussion of Related Art

Flexographic printing plates are resilient relief image plates made of rubber or photopolymer material, which are used to print on a wide variety of substrates. One critical step in the printing process is the accurate positioning of these printing plates onto the printing cylinder. The printing plate must be positioned such that the printing is parallel to the axis of the cylinder, i.e., not skewed. In multicolor printing, the plates for each different color must be aligned so they print in register. Frequently, this positioning is accomplished using pin registration drilling and mounting devices. The printing plate cylinder is typically removed from the printing press, and the plates are mounted using registration holes often in combination with a separate mounting device. However, for some printing presses, such as those typically used to print corrugated containers, the cylinders generally are not removed from the press. Therefore, the above registration systems cannot be used.

The traditional method for mounting flexographic plates for corrugated printing involves the use of a carrier sheet and a mounter/proofer unit. One or more plates are mounted onto a large flexible sheet known as the carrier sheet, and attached with adhesive or stickyback tape. The carrier sheet is then placed on the printing cylinder in the press. For multicolor printing, the plates for each successive color are positioned on other carrier sheets using a mounter/proofer unit with mirror. This practice is time intensive, highly dependent on the operator's skills, and potentially fraught with errors and inconsistent results. As the demands for improved registration increase, this method becomes increasingly unsatisfactory.

A major advance in the method of mounting plates for corrugated printing was achieved by the introduction of a single-head drill. With this drill, the printer was able to drill registration holes in both the carrier sheet and the plates. The plates were then mounted on the carrier sheet using mounting pins and stickyback tape. Once the plates were mounted, the pins were removed. Thus, the alignment of the plates on the carrier sheet was the same for each color and the need to use the mounter/proofer for mounting was eliminated. Both the speed and the accuracy of the mounting process were improved.

In the above-described apparatus, the alignment means for the drill was a laser light directed at an oblique angle onto the material to be drilled. The operator visually ascertained that the laser light was on the registration target located at the point to be drilled, and then drilled. This visual observation is made without magnification and is potentailly inconsistent. The laser light which shines on the material also scatters, preventing any precise location of the drill lead. Lastly, the position of the laser light relative to the actual drilling site is dependent on the thickness of the material to be drilled. Because the laser light is incident at an oblique angle, with thicker materials, the laser light impinges on the material at a point further removed from the actual drilling site than when thinner materials are drilled. Thus, if the laser is calibrated to focus on the actual drill site using thin materials, when thick materials are to be drilled, the actual drilled hole will be offset from the registration target. For flexographic printing plates, this drilling error results in misregistration of the plates and subsequent loss of quality during printing. Therefore, there exists a need for a drilling and mounting system for flexographic printing plates which overcomes the above disadvantages, especially for use in the printing of corrugated containers.

SUMMARY OF THE INVENTION

The present invention comprises an apparatus for drilling holes including a table mounted on a stationary base, a drill attached to supporting means located adjacent the table and mounted perpendicular to and aligned toward the table, and means for providing movement of the table and the supporting means relative to one another. A mirror is interposed between the drill and the table, such that a line intersecting the mirror and the drill is perpendicular to the table, with the mirror being retractably mounted on the supporting means. A video imaging system is aligned with the mirror. This invention also provides a method for drilling holes in flexible material using the above-described apparatus.

DETAILED DESCRIPTION OF THE PREFERRED EMBODIMENTS

Figure 1:
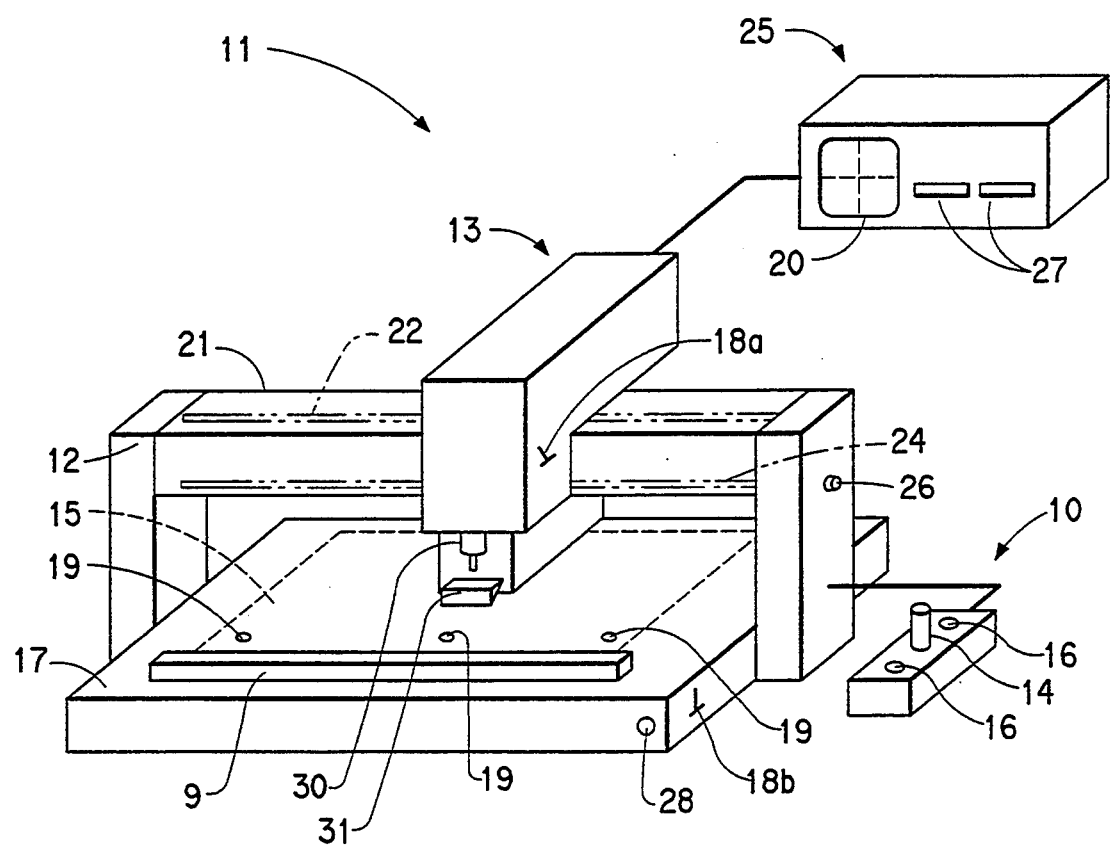
FIG. 1 is a perspective diagrammatic view of a drilling apparatus representing one embodiment of the present invention.

FIG. 1 illustrates a flexographic printing plate drilling apparatus 11 comprising supporting means 13, a drill 30 having a drill bit, a right-angle optical mirror 31, a TV-monitor 20 in a display unit 25 to provide visual registration of a location to be drilled, a guide supporting member 21, and a movable table 17 on top of which a flexible material 15 is mounted using mounting pins 19. The table 17 is slideably mounted over a stationary base (not shown) using guide blocks having ball raceways over a pair of grooved rails (not shown), which are located on top of the stationary base to provide hand movement of the table 17 in the direction perpendicular to the guide supporting member 21, hereinafter called the y-direction. The guide supporting member 21 is secured at its ends to the stationary base by end supports 12 and at a level above the table 17 and parallel thereto. The guide supporting member 21 includes a first threaded shaft 22 journalled within a threaded guide bracket attached to the supporting means 13, so that the supporting means 13 is caused to move over the table 17 parallel to the guide supporting member 21 when the first threaded shaft 22 is rotated. This direction of movement parallel to the guide supporting member 21 is hereinafter called the x-direction. A second threaded shaft 24, activated by rotatable control knob 26, provides operator adjusted, micrometer-like movement of the supporting means 13 in the x-direction. A third threaded shaft (not shown), controlled by rotatable control knob 28, provides micrometer-like movement of the table 17 in the y-direction, this movement being independent of movement of the supporting means 13 in the x-direction. Motor means to provide rotation of the first threaded shaft 22 are located within end supports 12 and are activated by a joystick 14 located on an electronic control console 10. The joystick 14 and the control knob 26 provide precise movement of the supporting means 13 in the x-direction above the surface of the table 17. In another embodiment, the table 17 is stationary and additional motor means within the end supports 12 are threadably coupled to a threaded shaft within the table 17 to provide movement of the supporting means 13 in the y-direction as well as in the x-direction. It is convenient that the x- and y-directions be perpendicular to one another but this is not a necessary restriction.

The table 17 is adapted along its front x-direction edge to accurately locate a positioning bar 9, also extending in the x-direction. Operator-activated locking arms 18a and 18b are installed within the supporting means 13 and within the table 17, respectively, to secure the position of the supporting means 13 and of the table 17 using cam lock-and-release linear actuators against the second 24 and third threaded shafts. Both the second and third shafts are preferably formed from hardened and ground stainless steel. The mechanical elements to provide x- and y-direction locking as well as motorized movement of the supporting means 13 are well known to those skilled in the art.

Figure 2:
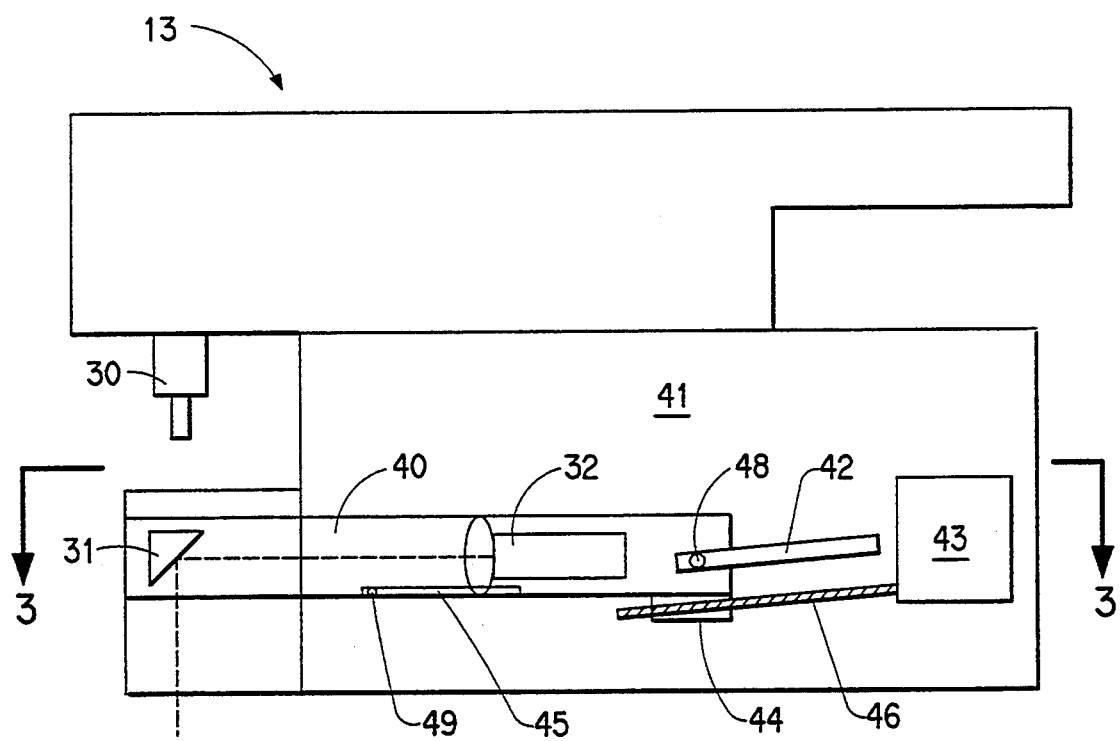
FIG. 2 is a schematic elevation view illustrating a portion of the apparatus of FIG. 1.

FIG. 2 illustrates the major units of the supporting means 13 previously described as mounted and moveable in the x-direction over the table 17, which is movable in the y-direction. An important feature of the present invention is an electrically driven, single-head drill 30 accurately positioned directly over the center of a right-angle optical mirror 31. The centerline of drill 30 and the center of right-angle optical mirror 31 define a line which is perpendicular to the table 17. The optical mirror 31 reflects an image of the target portion of the flexible material 15 positioned directly beneath the right-angle mirror 31. A video imaging system comprising a TV-camera 32 connected to a cross-line generator (not shown), the TV-monitor 20 and numerical displays 27 receives the image. The received image is captured by the TV-camera 32 that is connected to the TV-monitor 20 which includes electronic circuits that produce a cross-hair image comprising vertical and horizontal lines. The intersection of the vertical and horizontal lines coincides precisely with the portion of the flexible material 15 positioned directly beneath the center of the optical mirror 31. The TV-camera 32 typically produces a 25X magnification of the target area on the flexible material 15. The display unit 25 also comprises numerical displays 27 which read-out the x- and y-position coordinates of the right-angle optical mirror 31 over the flexible material. The technology used to generate the cross-hairs, display the received image and read-out the coordinate position of the optical mirror 31 is well known in the art, and is commercialized, for example, in the MICROWIZARD ® video imaging system produced by Anilam. The single-head drill 30 and the right-angle optical mirror 31 are in vertical alignment within a tolerance of ±0.0015 inches from the vertical centerline. The single-head drill 30, the right-angle optical mirror 31, the TV-camera 32 and TV-monitor 20 provide an optical system for enabling accurate positioning of the drill 30 over the sheet of flexible material 15 mounted onto the table 17.

FIG. 2 also shows the right-angle optical mirror 31, optics and the TV-camera 32 as a video camera assembly which is supported within a carrier cylinder 40 slideably mounted by brackets 41 attached to the supporting means 13. The carrier cylinder 40 has a first pair of projecting ears 48 and a second pair of projecting ears 49. The carrier cylinder 40 is disposed between a pair of side brackets 41 having grooves 42 and 45, with the ears 48 located within the grooves 42 and the ears 49 located within the grooves 45. A driving motor 43 is operatively connected to the carrier cylinder 40 using an internally threaded follower 44 on the carrier cylinder and a threaded shaft 46 driven by the motor 43. An important feature of the present invention is the retraction of the carrier cylinder 40 toward the driving motor 43, the ears 48 following within the grooves 42. The optical mirror 31 is removed from the path below the single-head drill 30 when the driving motor 43 is activated by a "retract" signal from the electronic control console 10. Alternatively, a pneumatic-controlled cylinder can be employed to move the video camera assembly. Subsequent to the "retract" signal, a delayed "drill" signal provided by the electrical console 10 to the single-head drill 30 activates the single-head drill 30 to rotate and simultaneously move downwards, drilling a hole through the flexible material 15 mounted on the table 17.

Figure 3:
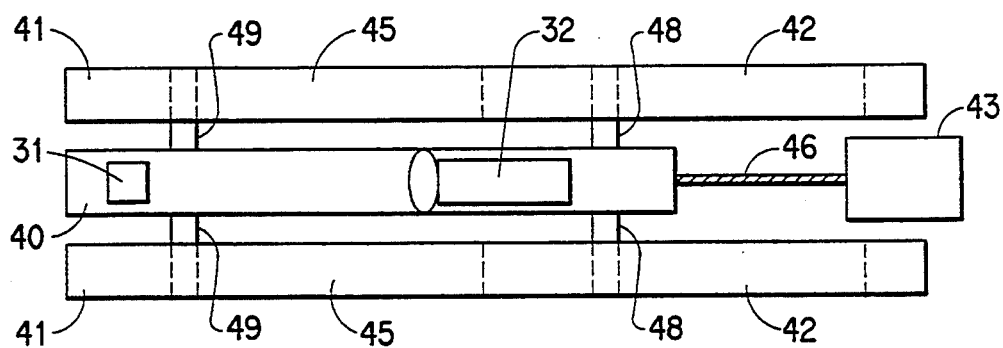
FIG. 3 is a plan view taken along line 3—3 of FIG. 2.

FIG. 3 shows the right-angle optical mirror 31 and the TV-camera 32 positioned within the slideably mounted carrier cylinder 40. The projecting circular ears 48 are located within grooves 42 in the two side brackets 41 that are angled toward motor 43. The projecting circular ears 49 are located within grooves 45 within the side brackets 41 that are parallel to the base of the side brackets 41. The driving motor 43 is operatively connected to the carrier cylinder 40 using an internally threaded follower 44 on the carrier cylinder 40 and a threaded shaft 46 driven by the motor 43. Thus, the carrier cylinder 40 is slideably mounted between the side brackets 41 and moveable from a first position between the drill 30 and flexible material 15 to a second position away from the path of the moveable drill 30, by means of threaded shaft 46, threaded follower 44, ears 48 placed within the grooves 42 and ears 49 placed within grooves 45, and the driving motor 43. Subsequent to completion of the drilling cycle, a delayed "return" signal is provided by the electrical console 10 to signal the driving motor 43 to reverse its direction of rotation, whereby the threaded shaft 46 and threaded follower 44 act to cause the carrier cylinder 40 supporting TV-camera 32 and optical mirror 31 to resume its original first position, the mirror 31 again being directly in vertical centerline with the drill 30.

A drill-travel electrical circuit within the control console 10 determines the position of full travel of the drill 30 through the flexible material 15 and causes the drill 30 to automatically withdraw to its original position. The drill-travel electrical circuit then signals the driving motor 43 to reposition the optical mirror 31 in its original position directly underneath the single-head drill 30 and vertically above a now-formed hole in the flexible material 15. By maintaining the x- and y-axis accuracy at ±0.002 inches from centerline across the guide supporting member 21 and throughout the front-to-back of the moveable table 17, respectively, reproducibility tolerance of a drilled hole can be maintained at ±0.0015 inches throughout the flexible material 15. The TV-camera 32 displays the image of the now-formed hole on the TV-monitor 20. The drill-travel electrical circuit is located within the control console 10 and is calibrated by, firstly, placing the single-head drill 30 in its "home" position and, secondly, advancing the drill 30 until it slightly deforms the table 17 when there is no flexible material 15 on the table 17 and when the moveable table 17 is surfaced with linoleum preferably. The drill 30 and electronic means to activate rotation and the travel circuit are commercially available from JDL Machine Company, North Rose, N.Y. Movement of the drill head through the flexible material 15 is preferably pneumatically powered; commercially available hollow point or solid metal drills are typically used.

In essence, the table 17 serves as a receiving means for sheets of flexible material 15 which are to be drilled by the drill 30 which typically would include a hollow-bit drill when thin flexible material is involved. The optical mirror 31, TV-camera 32 and monitor 20 serve as viewing means to directly view the exact position on the surface of the flexible material 15 to be drilled. In accordance with the present invention, the optical mirror 31 occupies a first position between the drill 30 and flexible material 15, the first position being directly below the drill and directly above a target location on a single sheet of material 15. The optical mirror 30 is retractable to a second position away from the path of the moveable drill 30, the optical mirror 30 being returned to the first position after the drilling is accomplished.

A typical process used for the above-described flexographic printing plate drilling apparatus 11 is described below in the context of printing a corrugated container, e.g., a box. The first step in the process is the preparation of the mechanicals for each color to be printed. The mechanicals are full scale representations of the artwork to be printed, including all registration marks, superimposed on a layout of the unfolded, flat container, i.e., the substrate to be printed. This starts with the die vinyl, sometimes called the die strike, which is a sheet, typically polyester, on which is drawn the full-scale layout of the unfolded, flat container. Copies of the artwork for each panel of the container are made. This can be done using proofing materials such as CHROMA-LIN ® proofing film (E. I. du Pont de Nemours and Company, Wilmington, Del.) and DYLUX ® proof paper (E. I. du Pont de Nemours and Company., Wilmington, Del.). These are then pasted up onto the die vinyl in the positions where they are to be printed. The location of pins to be used in mounting plates onto the carrier sheet are indicated by registration marks on at least one of the mechanicals. Methods for preparing the mechanicals are well known in flexographic printing.

A first mechanical, representing one of the colors to be printed, is placed on the table 17 and positioned with the leading edge of the die vinyl parallel to the positioning bar 9 and at a predetermined distance from the bar 9. The die vinyl is held in place using, for example, flat weights or a vacuum holddown. The drill 30 and right-angle mirror 31 are moved to a position over the table 17 which is to be the zero point. This can be one of the corners of the die vinyl at the leading edge, the center point of the die vinyl at the leading edge, etc. The movement of the drill 30 and right-angle mirror 31 relative to the table 17 is is accomplished by moving the table 17 along the grooved rails in the y-direction and also moving the supporting means 13 along guide supporting member 21 in the x-direction. The digital displays 27 are calibrated to x=0, y=0 at the desired zero point. The table 17 and/or means 13 are then moved again until a first registration mark is displayed on the TV-monitor 20. Further fine adjustments of the table 17 and the supporting means 13 are made until the registration mark is in exact alignment with the cross-hair grating of the TV-monitor 20. The position of supporting means 13, i.e., the x- and y-coordinates from numerical displays 27, are recorded. The table 17 and means 13 are moved again until a second registration mark is displayed on the TV-monitor 20. Fine adjustments are made and the coordinates recorded as before. This procedure is repeated for all the remaining registration marks on the first mechanical.

The first mechanical is removed and a first carrier sheet is placed on the table 17. The carrier sheet is generally a heavy-gage flexible plastic material. A typical carrier sheet is made of polyester and has a thickness of about 30 mils (0.076 cm). The carrier is positioned on the table 17 using the positioning bar 9. The bar 9 can be a MATTHEWS ® lock or similar positioning device. In some cases, special clamping devices built into the printing cylinder are used to hold the carrier in place during printing. When these are used, it is advantageous to have the same type of clamping device used for the bar 9. The carrier can also be positioned using register holes and mounting pins 19. The pins or bar can be permanently or removably attached to the table 17. The carrier is kept from moving by use of, for example, flat weights or a vacuum holddown. The table 17 is moved in the y-direction and the supporting means 13 is moved along the guide supporting member 21 in the x-direction, until the position having the x- and y-coordinates recorded for the first registration mark are obtained. The supporting means 13 is locked into place using locking means 18a, and the drill 30 is activated by simultaneously operating two drill switch buttons 16. The optical mirror 31 and the TV-camera 32 are retracted back to their second position, and the drill 30 drills through the carrier sheet. When the drill 30 reaches the deformable cover material on the table 17, drilling stops. The drill 30 returns to its original position, and then the optical mirror 31 and the TV-camera 32 return to their original first position. The table 17 and the supporting means 13 are then moved until the coordinates of the second registration mark are obtained. The supporting means 13 is locked into place using locking means 18a, and the drill is activated. This is repeated for all of the remaining registration marks.

The first carrier sheet with registration holes is then removed from the table 17. If the registration marks are placed the same for all the different colors, a second carrier sheet can then be placed on the table 17 and treated as above. This is repeated until carrier sheets for all of the colors have been drilled. If the placement of registration marks is different for the different colors, then a second mechanical is placed on the table 17 and treated as above. Then, the second carrier sheet is drilled, using the coordinates measured in the second mechanical. This is repeated until carrier sheets for all of the colors have been drilled.

The next step is to drill registration holes corresponding to the registration marks for each of the flexographic printing plates. A first flexographic plate is placed on the table 17 such that it is square with the positioning bar 9. The plate can be held in place with, for example, pins, vacuum holddown or weights. The table 17 is moved in the y-direction and the supporting means 13 is moved along the guide supporting member 21 in the x-direction, until a first registration mark is displayed on the TV-monitor 20. Further fine adjustments of the table 17 and the supporting means 13 are made until the registration mark is in exact alignment with the cross-hair image of the TV-monitor 20. The drill is then activated as described above to drill a hole through the registration mark. This process is repeated for all the registration marks on all of the flexographic plates.

After all of the drilling has been completed, the flexographic printing plates are mounted onto the carrier sheets. Stickyback tape is applied to the non-printing (non-relief) side of an individual plate. The plate is then positioned over the appropriate carrier sheet such that the registration pins in the carrier sheet will go through the registration holes in the plate. The plate is then pressed down on the carrier sheet. After the plate is firmly attached to the carrier sheet, the registration pins are removed. When all of the plates have been mounted on a carrier sheet, the carrier is mounted onto the printing cylinder. The sheets are usually held to the cylinder with tension bands or with special clamping devices built into the cylinder.

Although the flexographic printing plate drilling apparatus of the present invention is particularly suited for use with printing presses for corrugated containers, and has been described in detail for such printing, the apparatus has considerable flexibility and in no way is restricted to such a use. The apparatus can be used for the printing of any of the other substrates used in flexographic printing. The apparatus also can be used for drilling raw plates (flexographic printing elements prior to development into plates) and the associated different color separations (photographic negatives) to ensure proper registration of element and separation. Also, the apparatus can be used to advantage with registration systems in which there is three-point control, or any non-linear array of registration holes.

What is claimed is:

1. In an apparatus for drilling holes including a table mounted on a stationary base, a drill attached to supporting means located adjacent the table and mounted perpendicular to and aligned toward the table, and means for providing movement of the table and the supporting means relative to one another, the improvement comprising a mirror interposed between the drill and the table, such that a line intersecting said mirror and the drill is perpendicular to the table, said mirror being retractably mounted on the supporting means, and a video imaging system aligned with said mirror.

2. An apparatus for drilling holes in accordance with claim 1 wherein said mirror comprises a right angle optical mirror.

3. An apparatus for drilling holes in accordance with claim 1 wherein the drill comprises a single-head, hollow point drill.

4. An apparatus for drilling holes in accordance with claim 1 wherein the video imaging system comprises a TV-camera having a cross-hair reticule connected to a TV-monitor, and a numerical display providing the location of said drill.

5. An apparatus for drilling holes in accordance with claim 1 wherein the table is stationary relative to the base.

6. An apparatus for drilling holes in accordance with claim 1 wherein the table is moveable relative to the base in a first direction, and the supporting member is moveable relative to the base in a second direction.

7. A process for locating a hole target on a material and drilling a hole at said hole target using an apparatus having a table mounted on a stationary base, a drill attached to supporting means located adjacent the table and mounted perpendicular to and aligned toward the table, means for providing movement of the table and the supporting means relative to one another, a mirror interposed between the drill and the table, such that a line intersecting said mirror and the drill is perpendicular to the table, said mirror being retractably mounted on the supporting means, and a video imaging system aligned with said mirror, the process comprising mounting said material on the table, the material having a hole target defining the location to be drilled; moving the table and the supporting means relative to one another until said mirror is aligned directly over the hole target and the hole target is displayed by the video imaging system; retracting said mirror from said intersecting line beneath the drill; and drilling a hole in the material at the hole target.

8. A process for locating a hole target in accordance with claim 7, wherein the table is stationary relative to the base.

9. A process for locating a hole target on a material and drilling a hole at said hole target in accordance with claim 7, wherein the table is moveable relative to the base in a first direction, and the supporting member is moveable relative to the base in a second direction.

* * * * *